Figure 1:
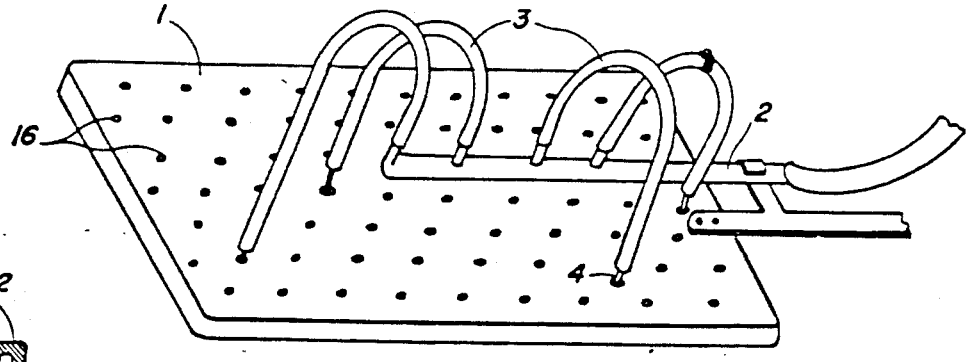
Figure 7:
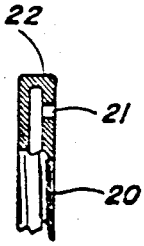
Figure 2:
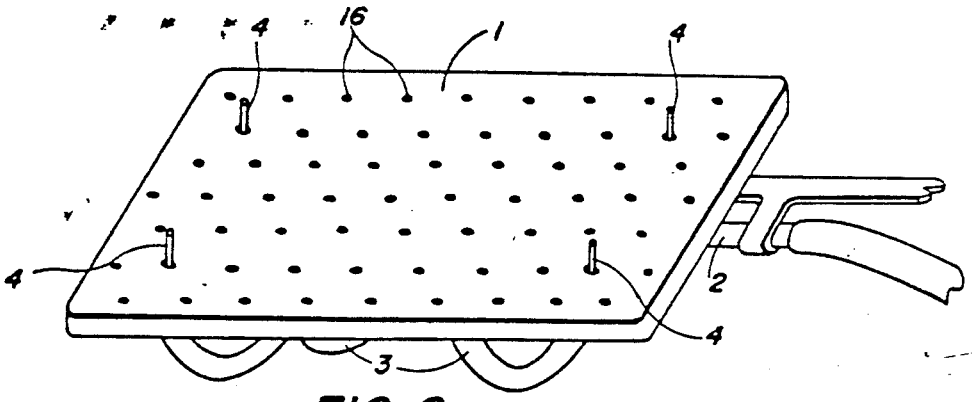
Figure 3:
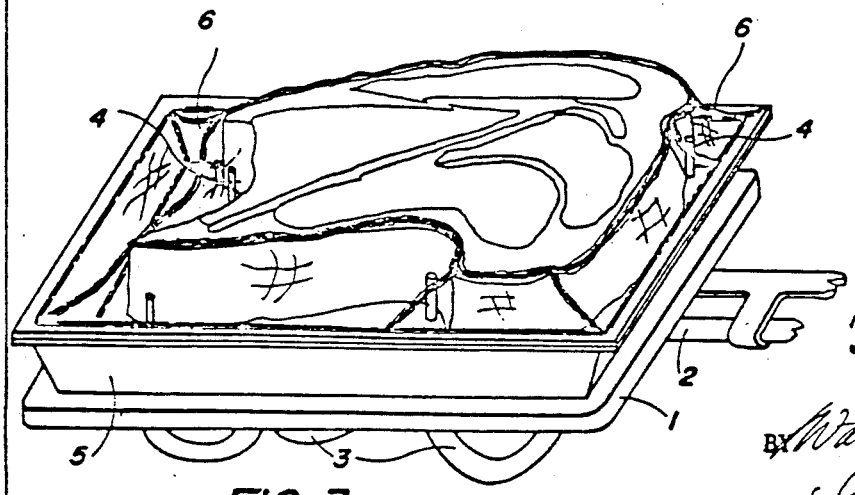
Figure 4:
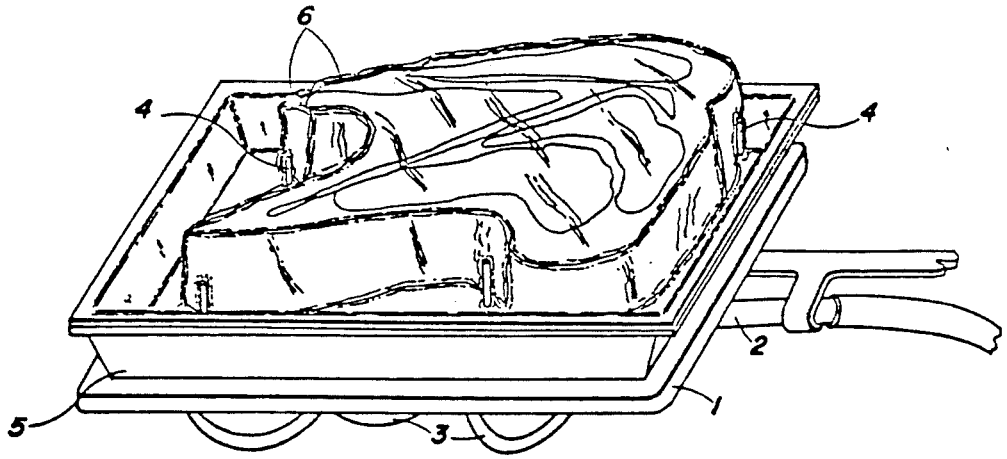
Figure 5:
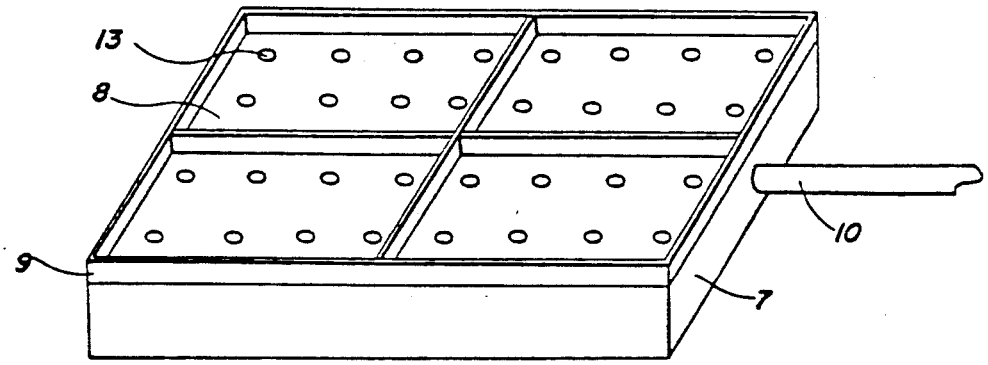
Figure 6:
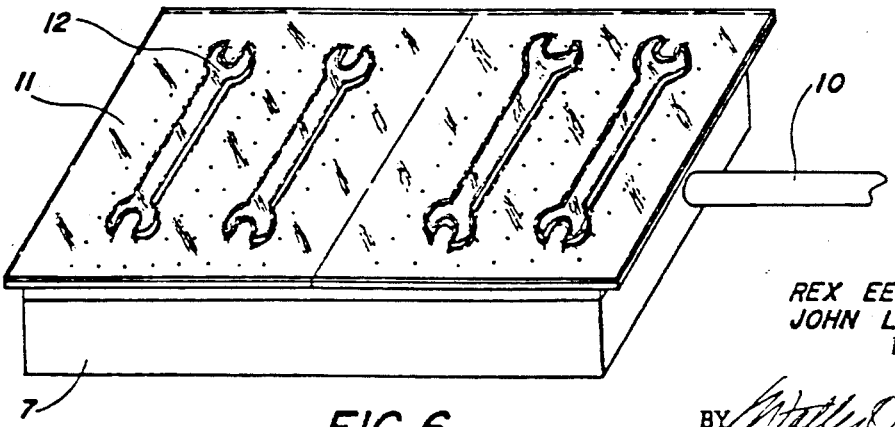

BEST AVAILABLE COPY

DEFENSIVE PUBLICATION

T857,001

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 41

534,488

VACUUM SYSTEM FOR SKIN PACKAGING USING A CURTAIN COATING METHOD AND PACKAGED ARTICLES PRODUCED

Rex Eells and John L. Cameron, both of P.O. Box 431, Kingsport, Tenn. 37662

Filed Mar. 15, 1966. Published Dec. 3, 1968

Class 53—22

2 Sheets Drawings, 14 Pages Specification

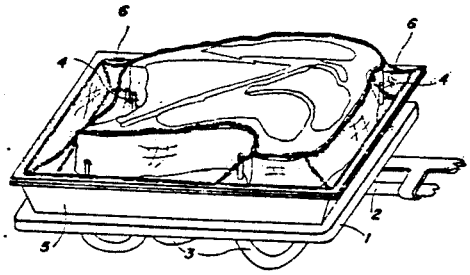

A method for packaging an article including the steps of placing the article on a substrate, curtain coating the article and the substrate with a viscous, molten, thermoplastic composition, and evacuating the atmosphere between the substrate and the coating through apparatus adapted to transmit air through the substrate to a vacuum producing means. Evacuation occurs at least within a border area defined by a perimetric strip having a narrow width extending just beyond the perimeter of the article where it is in contact with the substrate. The package thus formed has a coating of thermoplastic material in intimate contact with the article and the substrate at least within a border area defined by a perimetric strip having a narrow width extending just beyond the perimeter of the article where it is in contact with the substrate. Apparatus for producing such a package includes a support for the substrate and the articles to be packaged, vacuum producing apparatus, an aperture extending through the substrate into the space between the substrate and the coating and connected to the vacuum producing apparatus.

NO COPIES

T 857,001 BEST AVAILABLE COPY

T857,001

~~584488~~

53 22

DEC. 3 1968

REX EELLS
JOHN L. CAMERON
INVENTORS

BY Walter O. Hodsdon
Charles L. Good
ATTORNEYS

APPROVED BY DRAFTSMAN

BEST AVAILABLE COPY

T 857001

534488

REX EELLS
JOHN L. CAMERON
INVENTORS

BY Walter D. Jackson
Charles L. Good
ATTORNEYS